J. A. CONWAY.
Flower-Pot.

No. 197,765. Patented Dec. 4, 1877.

WITNESSES.
E. W. Perrin
G. W. Merrill

INVENTOR.
John A. Conway

N. PETERS, PHOTO-LITHOGRAPHER, WASHINGTON, D. C.

UNITED STATES PATENT OFFICE.

JOHN A. CONWAY, OF TOLEDO, OHIO.

IMPROVEMENT IN FLOWER-POTS.

Specification forming part of Letters Patent No. 197,765, dated December 4, 1877; application filed September 27, 1877.

*To all whom it may concern:*

Be it known that I, JOHN A. CONWAY, of Toledo, in the county of Lucas and State of Ohio, have invented a new and useful Improvement in Vases, which improvement is fully set forth in the following specification, reference being had to accompanying drawing, of which—

Figure 1:
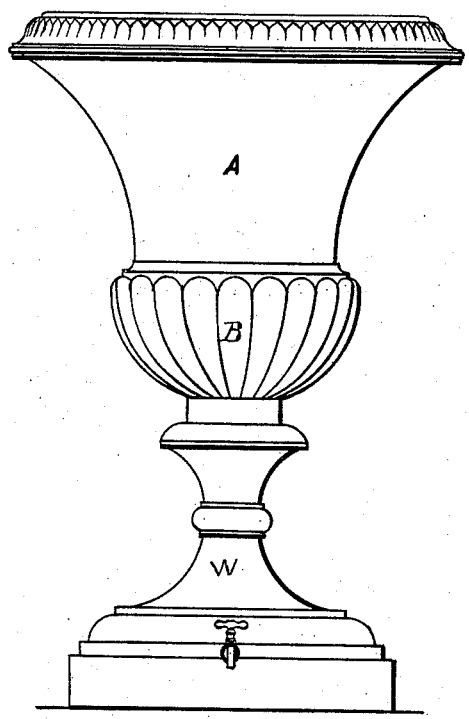
Figure 2:
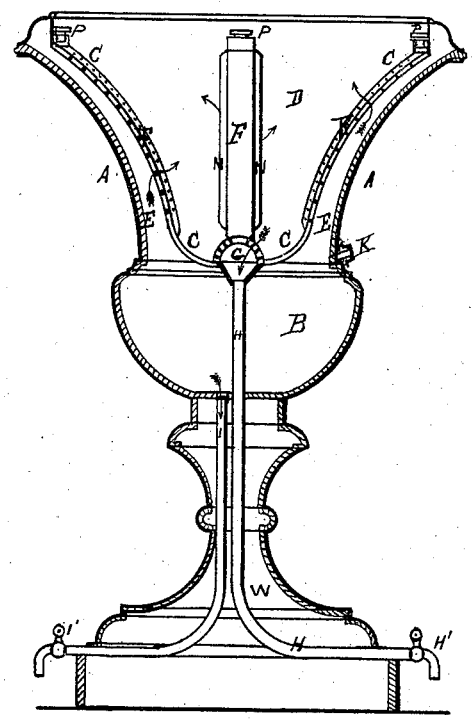
Figure 3:
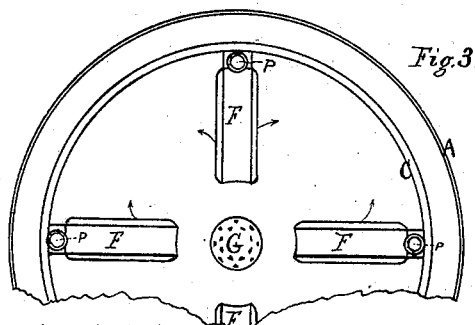
Figure 4:
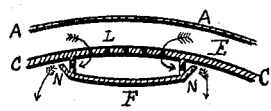

Figure 1 is an elevation; Fig. 2, a sectional elevation. Fig. 3 is a plan, and Fig. 4 an enlarged section, showing vapor-chambers and perforations.

The object of my invention is to provide for moistening or irrigating the earth contained in the vase by capillary attraction from the water-chamber underneath, as follows:

Water in reservoir B evaporates into vapor-chamber E, passing through inside lining C and into earth-chamber D through openings or perforations L.

A represents outside shell of vase; E, shield or covering to prevent perforated plate L from direct contact with the earth; G, screen over earth-chamber and drain-pipe H, and H' faucet near end of said pipe; I, drain-pipe from water-chamber B, and I' faucet in same; K, influent opening for supplying or filling water-chamber; N, extension of shield F, for further protecting perforations L; P, opening to facilitate the cleansing of perforation-chambers, and W stem of vase.

I claim as my invention—

1. The combination of water and earth chambers B and D with drain-pipes H and I, screen G, vapor-chamber E, and influent opening K.

2. Perforated plates L, in connection with inner lining C, protections F and N, and cleansing-apertures P, substantially as set forth.

JOHN A. CONWAY.

Witnesses:
    E. W. PERRIN,
    G. W. MERRILL.